(12) United States Patent
Russo

(10) Patent No.: US 9,099,951 B2
(45) Date of Patent: Aug. 4, 2015

(54) DETERMINATION OF STEPPER MOTOR POSITION VIA DIGITAL DATA ACQUISITION

(75) Inventor: Kevin D. Russo, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 786 days.

(21) Appl. No.: 13/405,620

(22) Filed: Feb. 27, 2012

(65) Prior Publication Data

US 2013/0226497 A1  Aug. 29, 2013

(51) Int. Cl.
*H02P 8/14* (2006.01)
*H02P 8/22* (2006.01)
*H02P 8/38* (2006.01)

(52) U.S. Cl.
CPC ... *H02P 8/22* (2013.01); *H02P 8/38* (2013.01)

(58) Field of Classification Search
CPC .................................. G06F 19/00; G06F 15/00
USPC ........... 318/490, 685, 696; 702/115, 182, 183
See application file for complete search history.

(56) References Cited

U.S. PATENT DOCUMENTS

| 4,945,760 | A | 8/1990 | Hornung |
| 6,829,565 | B2 | 12/2004 | Siegel et al. |
| 7,157,879 | B2 | 1/2007 | Rogers et al. |
| 2013/0226500 | A1* | 8/2013 | Russo .......................... 702/120 |

* cited by examiner

*Primary Examiner* — Bentsu Ro
(74) *Attorney, Agent, or Firm* — Harness, Dickey & Pierce, P.L.C.

(57) ABSTRACT

A method for evaluating a gauge controller is disclosed. The method includes counting a number of high pulses for a plurality of signal types until either each of the control signals present low signals. After the number of high signals are counted, an angular offset of a gauged needle is calculated.

20 Claims, 5 Drawing Sheets

EXAMPLE OF ROTATION THROUGH 180°
-SIN CHANGES SIGN WHILE COSINE REMAINS NEGATIVE
THIS IS THE ROLLOVER CONDITION

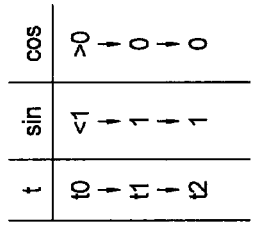
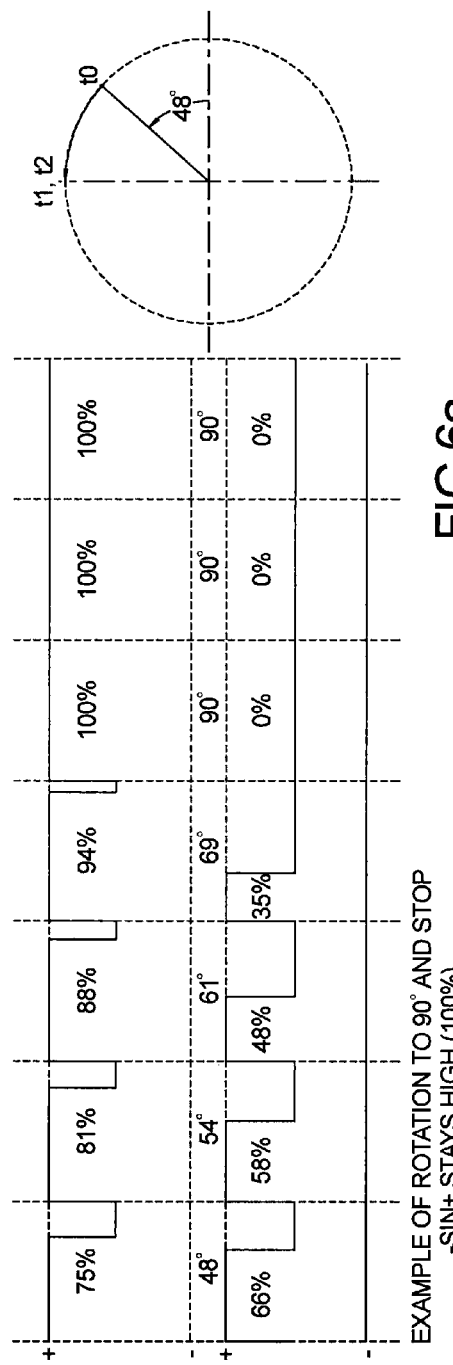
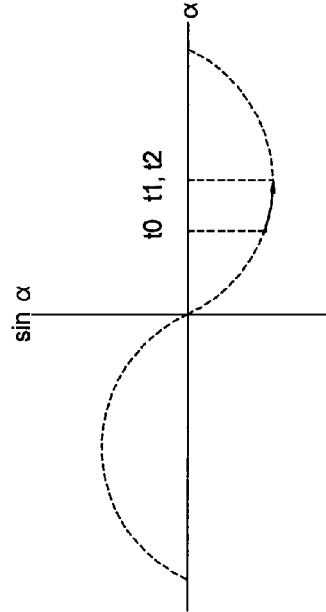

DETERMINATION OF STEPPER MOTOR POSITION VIA DIGITAL DATA ACQUISITION

FIELD

The present teachings relate to a test device for testing a controller and, more particularly, to a testing device which evaluates stepper motor control signals for a gauge cluster.

BACKGROUND

Because digital controllers are becoming more complex, and are operating at ever-increasing speeds, the equipment for testing such controllers is also becoming more complex and more expensive. Developments in test equipment which provide lower costs and better testing techniques are, therefore, most useful.

Controllers are customarily tested after component assembly is completed in order to find and remove any defects. Whether they are related to manufacturing (such as solder shorts, copper shorts or wrong, misplaced or missing components), defective components, or errors in software installation, expected outputs in response to predetermined inputs are typically evaluated.

Instrument cluster controllers for gauge needles are customarily evaluated by probing the board at strategic testing locations and by optical observation of the gauge cluster. The cluster controllers can also be both stimulated and monitored through the probe points. In the past, it has frequently been necessary to verify needle movement manually or by using camera based verification systems. These systems are, however, costly and in the case of camera based systems, also can degrade the response signal to movement of the gauge, because of problems inherent in machine vision technologies. As such, the evaluation of these forms of control signals has been found in the past to be problematic and difficult. Development of techniques to automatically evaluate digital controller stepper motor signals would therefore be useful.

SUMMARY

This section provides a general summary of the disclosure, and is not a comprehensive disclosure of its full scope or all of its features.

A system for testing the output of a controller is disclosed. The system has a data entry interface configured to receive a plurality of stepper motor control signals from a controller. A test module is initialized to determine if a plurality of stepper motor control signals are synchronized. If the stepper motor control signals are synchronized, the number of high signals for each of the stepper motor control signals is counted until either, each of the signals is low, or any of the counts of high signals is greater than a predetermined number. After the number of high signals is counted, the test module again determines if the signals are synchronized. If the signals are synchronized, the analysis module determines if a rollover condition is reached. If the rollover condition is reached, a rollover counter is incremented and the pulse count for each signal is adjusted. An offset angle for a gauge is calculated based upon the plurality of adjusted high counts.

According to the present teachings, a system for testing the output of a controller is disclosed. The system has a data entry interface configured to receive first and second SINE stepper motor control signals and first and second COSINE stepper motor control signals. When the signals are synchronized, the number of high signals is counted until either the signals all register low or one of the signals presents a high signal count in excess of a predetermined amount. The analysis module then determines if the signals remained synchronized. If a rollover condition is detected, a rollover counter is incremented. The analysis module then calculates an offset angle for a needle gauge based on the high signal counts. Optionally, an analysis module determines if this offset angle is within a predetermined range of expected values.

According to an alternate teaching, a method for evaluating a gauge controller is disclosed. The method includes selectively transferring first and second SINE stepper motor control signals to a log. First and second COSINE stepper motor control signals are also transferred to the log. After the stepper motor control signals are synchronized, the number of high pulses for each signal type is counted until either each of the signals present low signals, or the number of high signals measured for a given signal is above a predetermined number. After the number of high signals is counted, an angular offset of a gauged needle is calculated.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 6a-6c represent the rotation of the stepper motor and associated control drive signals according to the present teachings.

Corresponding reference numerals indicate corresponding parts throughout the several views of the drawings.

DETAILED DESCRIPTION

Example embodiments will now be described more fully with reference to the accompanying drawings.

Figure 1:
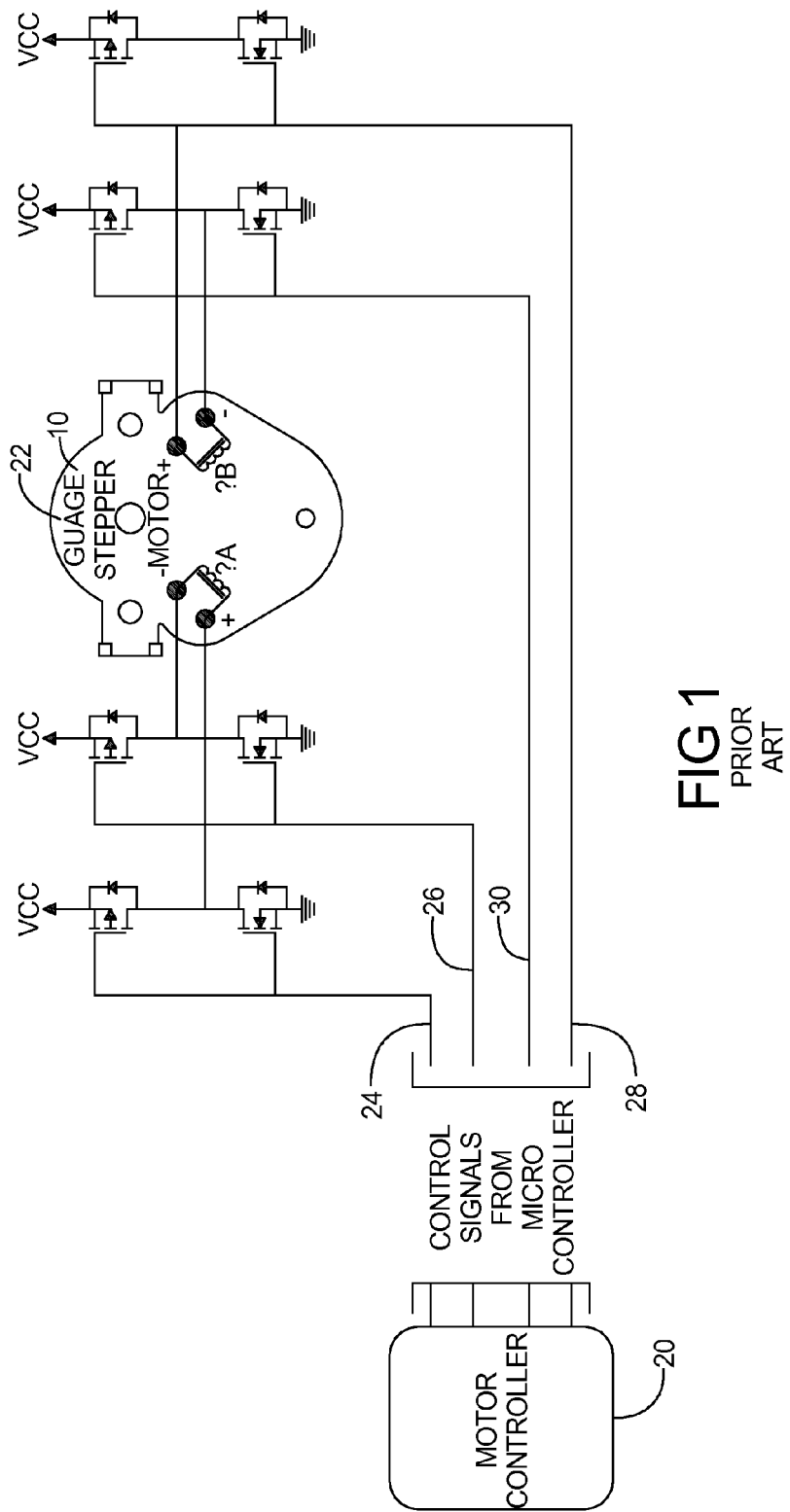
FIG. 1 represents a stepper motor for a gauge assembly.

FIG. 1 represents a stepper motor and transmission 10 for a gauge assembly. Shown is a stepper motor controller 20 operably coupled to a gauge stepper motor 22 via four discrete digital stepper motor control signals (24-30). The four data signals include a first SINE stepper motor control signal 24 which represents a SIN+ signal and a second SINE stepper motor control signal 26 which represents a SIN− signal. The data signals additionally include a first COSINE stepper motor control signal (COS+) 28 and a second COSINE stepper motor control signal (COS−) 30.

Figure 2:
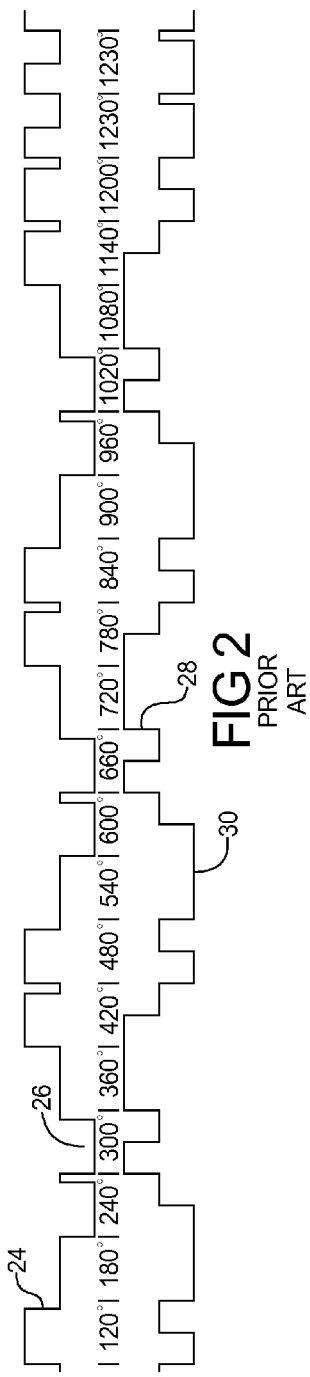
FIG. 2 represents control signals used to drive the stepper motor shown in FIG. 1.

Examples of these stepper motor control signals 24-30 are shown in FIG. 2. These pulse width control signals are used to control the angular movement of a needle gauge. Generally, the stepper motor is geared having a high gearing ratio. For example, every 360° of stepper motor 22 rotation can represent about 2° of gauge needle rotation.

Figure 3:
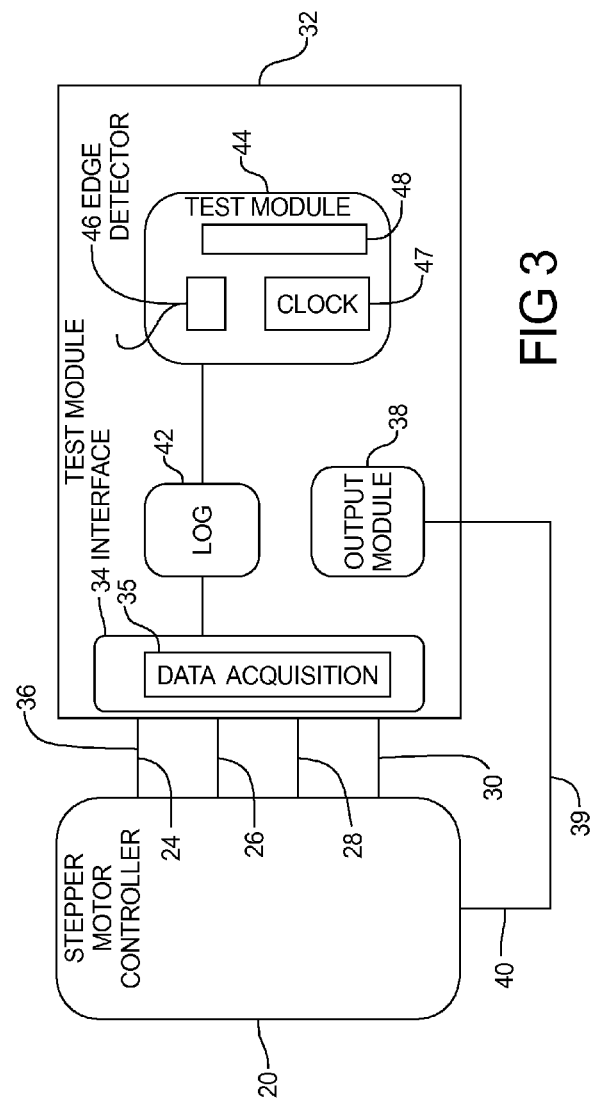
FIG. 3 represents the testing system according to the present teachings.

FIG. 3 represents the testing system according to the present teachings. Shown is a testing module 32 coupled to the stepper motor controller 20. In this regard, the testing module 32 has a data entry interface 34 coupled to four output lines 36 from the stepper motor controller 20. Optionally, the testing module 32 can have an output module 38 which provides environmental output signals 39 which are coupled to inputs 40 on the controller 20. These environmental output signals 39 can simulate operative test conditions per a predetermined test plan.

The data entry interface 34 can contain a data acquisition system 35 having a sampling rate of about 106 samples per second. This data acquisition system 35 is configured to acquire and buffer the pulse width modulated control stepper motor control signals (24-30) from the stepper motor controller 20.

Data from the data entry interface 34 can be transferred to a log 42 for storage prior to data evaluation. A test module 44 then evaluates the stored stepper motor control signals (24-30). Generally, the test module 44 synchronizes the stepper motor control signals (24-30). When a low to high signal is detected, the test module 44 begins to count the number of high signals for the four stepper motor control signals (24-30). In the event the controller 20 fails to produce a synchronous signal within a predetermined amount of time, an error signal is produced.

The test module 44 stops counting high signals when either all of the signals go low or if the number of counts for any of the stepper motor control signals (24-30) exceed a predetermined number of counts. In this regard, the predetermined number of counts is equal to the number of samples expected for a given expected input signal and the digital acquisition sampling rate given an appropriate tolerance level. In the event the number of high signals is outside of a predetermined range, an error signal is produced.

When all the stepper motor control signals (24-30) go low or the number of signals is greater than a predetermined amount, the test module determines if a rollover condition has been reached by counting the number of high signals. In this regard, a rollover condition occurs when the SINE count switches sign while the COSINE signal was negative. Generally, the roller event occurs when the stepper motor has rotated through the +/−180°. This allows for the arctan calculation of the angle.

The test module 44 can contain a leading edge detector 46 which is used to determine whether the signals are synchronous or not. Additionally, the test module 44 can contain a clock 47 which is used to determine the phase difference between various stepper motor control signals (24-30), and a counter 48 which counts the high signals.

To determine if the various stepper motor control signals (24-30) are in phase, the analysis module can optionally start three counters upon encountering a high signal in one of the four stepper motor control signals (24-30). The leading edge detector can be used to determine the appearance of a high signal. Each of the counters is selectively stopped at the detection of a high signal on one of the stepper motor control signals (24-30). These counters can then be used to determine if the phase difference between the stepper motor control signals (24-30) are proper. In the event the phases between the stepper motor control signals (24-30) are outside of a predetermined threshold, an error signal can be produced. This can be determined by comparing the output signals to expected values. Optionally, the system can detect if the leading edges of the SINE and COSINE signals are aligned. The alignment of the leading edges can be within a predefined tolerance band.

Figure 4:
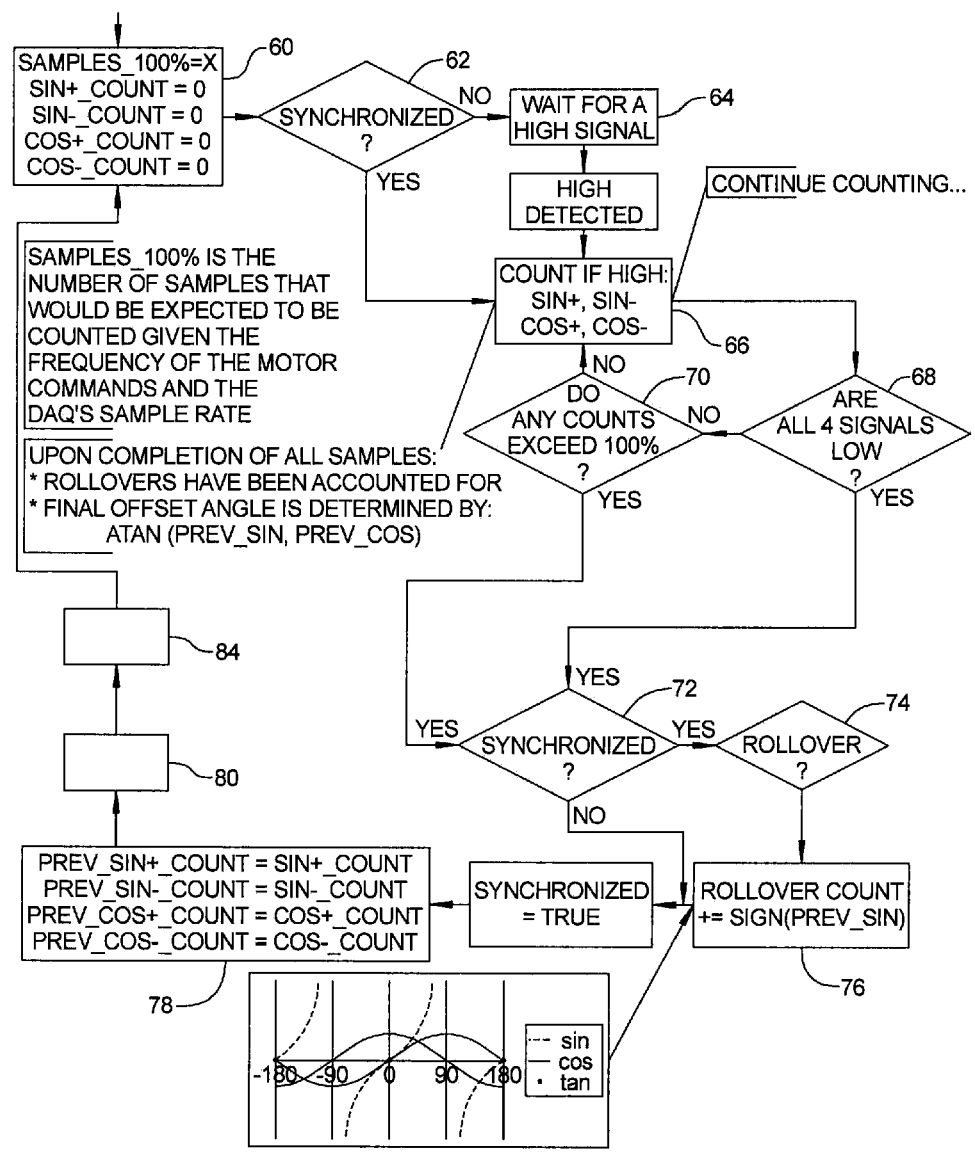
FIG. 4 represents an algorithm associated with a microcontroller in the test module shown in FIG. 3.

FIG. 4 represents a flowchart describing the controller checking algorithm according to the present teachings. The algorithm begins in process block 60 which reads the first and second SINE stepper motor control signals 24, 26 and the first and second COSINE stepper motor control signals 28, 30, and determines in process block 62 if the signals are synchronized. If the signals are not synchronized, the system waits in process block 64 for a predetermined amount of time for the detection of a high signal. Upon detection of the high signal, the system counts the number of high signals in process block 66.

The system continues to count the number of high signals (see block 68 and 70) until either all the stepper motor control signals (24-30) are low or any of the stepper motor control signals (24-30) high signal count is greater than a predetermined amount for a given test condition. The system then reevaluates if the stepper motor control signals (24-30) remained synchronized in process block 72. In the event the signal remains synchronized, the system determines in query block 74 of a rollover condition is detected. If the rollover condition is detected, the system increments the rollover count in process block 76.

If the stepper motor control signals (24-30) do not remain synchronized, a synchronization flag is reset. Optionally, an error signal can be produced. In process block 78, SIN_controller_sum and COSINE_controller_sum variables are incremented by the number of high signals counted. Finally, an offset angle of the gauge needle is calculated based upon the measured high SINE and COSINE signals in process block 80 as well as the offset counter. In this regard, the calculated offset angle is based upon ATAN (SIN, COS) of the signal counts is calculated in process block 84. The value of the rollover counter and offset angle is compared to an expected value. Should the expected values for the angular offset and the offset counter not be within an acceptable range, the system initiates an error signal.

Figure 5A:
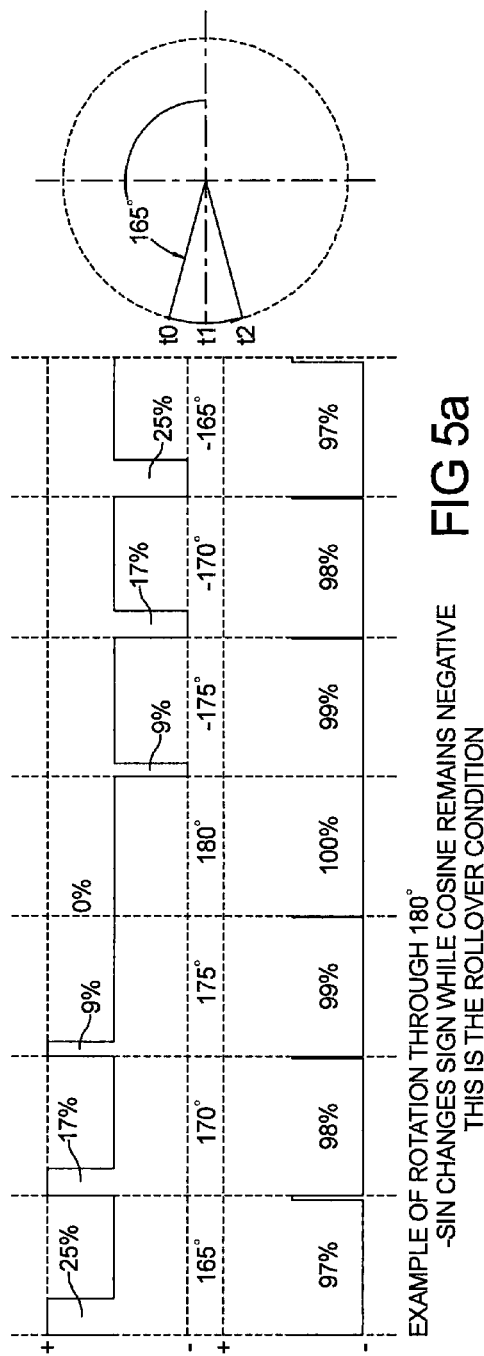
FIGS. 5a-5c represent the detection of a rollover condition.
Figure 5B:
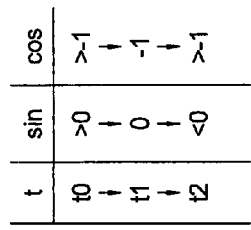
Figure 5C:
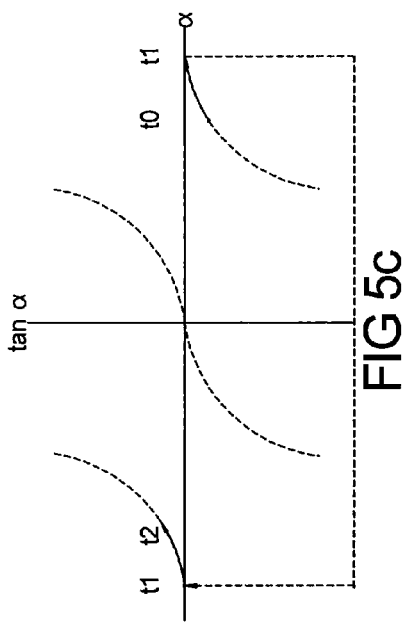

FIGS. 5a-5c represent the detection of a rollover event. The signals show the rotation of the motor through 180°. As is shown, the SINE signal changes sign while the COSINE signal remains negative. FIG. 5c represents the movement of the signal through the arctan calculation.

FIGS. 6a-6c represent the rotation of the stepper motor and associated control drive signals according to the present teachings. When the motor is rotated to 90° and stopped, the SIN+ remains high. This is a normal output. Additionally, when the system is evaluating the 90° signal, should the COSINE+ or COSINE− signal not be at zero or if the SIN+ signal is not held high, the analysis module can issue an error signal.

In checking the signals, the system first conducts a validation. The control signal must be issued in correct phase and duty cycle duration. To be considered valid, the following should be detected. Signal validation should be conducted for every pulse width modulation cycle. In the case where the motor angle is a constant value of 90°*n (where n is [−2, 1]), one signal will be 1, while three signals will be zero.

Additionally, validation can determine if all four signals are zero concurrently at some point in time. Typically, one and only one signal of {SIN+/−} shall transition to 1 concurrently with one, and only one COSINE signal that transitions to 1. One or both of these signals shall transition to zero. If only one of these signals transitions to zero, no signal will transition to 1 until the next pulse modulation cycle begins. An additional validation can include determining if the sum of the squares of the high periods of the signals equals the squares of the nominal period of the commanding pulse with modulation.

When the motor angle acquisition begins, the acquisition will not be synchronized with a pulse width modulation cycle.

To synchronize the signal, the analysis module will count the number of high signals. For each subsequent signal sample, the analysis module will count the number of high signals. If the number of high signals increases, the signal is considered synchronized. If, however, the signal does not satisfy the above rules, the analysis module will assume the motor analysis is one of 90°*n (where n is [−2, 1]). The motor remains unsynchronized, and the motor angle is calculated using an ATAN calculation.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computing device for evaluating a digital controller comprising:
   a data entry module configured to receive first and second SINE stepper motor control signals and first and second COSINE stepper motor control signals;
   an analysis module having a leading edge detector configured to determine if the first and second SINE stepper motor control signals are synchronized;
   a counter configured to individually count the number of high pulses for the first and second SINE stepper motor control signals and the first and second COSINE stepper motor control signals, the counter stopping when one of all the first and second SINE stepper motor control signals and first and second COSINE stepper motor control signals are low, and the counter registers a number greater than a predetermined value, wherein the analysis module increments a rollover counter if a rollover condition has occurred, the analysis module increments a first and second SINE counter and first and second COSINE counter by a respective number of signals, said analysis module configured to calculate a final offset angle of a needle gauge based on the first and second SINE counter and the first and second COSINE counter.

2. The computing device according to claim 1, wherein the analysis module initiates an error signal if the final offset angle of a needle gauge is outside of a predetermined range.

3. The computing device according to claim 1, wherein the analysis module initiates an error signal if the analysis module does not determine the first and second SINE stepper motor control signals are synchronized within a predetermined amount of time.

4. The computing device according to claim 1, wherein the analysis module further determines if the first and second COSINE stepper motor control signals are synchronized to the first and second SINE stepper motor control signals.

5. The computing device according to claim 4, wherein the analysis module initiates an error signal if the first and second COSINE stepper motor control signal is not synchronized with the first and second SINE stepper motor control signal.

6. The computing device according to claim 1, wherein the analysis module initiates an error signal if the rollover counter is not equal to a predetermined value.

7. The computing device according to claim 1, wherein the analysis module initiates a pass signal if the final offset angle of a needle gauge and rollover counter are within a predetermined tolerance.

8. The computing device according to claim 1, wherein the analysis module determines if the first and second SINE stepper motor control signals and the first and second COSINE stepper motor control signals are synchronized after the counter is stopped.

9. A test apparatus for evaluating a digital stepper motor controller comprising:

a data entry interface configured to receive first and second SINE stepper motor control signals and first and second COSINE stepper motor control signals;

an analysis module configured to determine if the first and second SINE stepper motor control signals and the first and second COSINE stepper motor control signals are synchronized; and a) if the first and second SINE stepper motor control signals and first and second COSINE stepper motor control signals are synchronized, counting the number of high pulses for the SINE and COSINE stepper motor control signals until all of the first and second SINE stepper motor control signals and first and second COSINE stepper motor control signals are low, and b) after counting the number of high pulses for the SINE and COSINE stepper motor control signals, if a rollover condition has occurred, update a rollover counter, and c) incrementing a first and second SINE_sum_counter by a first and second SINE count and increment a first and second COSINE_sum_counter by a first and second COSINE count.

10. The test apparatus according to claim 9, wherein the analysis module calculates a final offset angle of a gauge needle as a function of the first and second SINE_sum_counter and the first and second COSINE_sum_counter.

11. The test apparatus according to claim 10, wherein the function of the first and second SINE_sum_counter and the first and second COSINE_sum_counter is ATAN of the first and second SINE_sum_counter.

12. The test apparatus according to claim 10, wherein the computing device issues a signal indicative of a pass signal if final offset angle is within a predetermined range.

13. The test apparatus according to claim 9, wherein if the first and second SINE stepper motor control signals and first and second COSINE stepper motor control signal are not synchronized, the analysis module waits until a high signal is detected in the first SINE stepper motor control signal before counting the first and second high SINE stepper motor control signals and first and second high COSINE stepper motor control signals.

14. The test apparatus according to claim 9, further comprising an output module configured to output an environmental condition signal to the digital gauge stepper motor controller.

15. The test apparatus according to claim 9, wherein the analysis module determines if one of a counted number of first or second stepper motor high SINE signals and a number of first or second stepper motor high COSINE signals is greater than a predetermined number of high signals.

16. The test apparatus according to claim 9, wherein the computing device issues an error if the first and second SINE stepper motor control signals are not determined to be synchronized within a predetermined amount of time.

17. A method for evaluating a gauge controller, comprising:

selectively transferring first and second SINE stepper motor control signals to a log;

selectively transferring first and second COSINE stepper motor control signals to the log;

determining if the first and second SINE stepper motor control signals and first and second COSINE stepper motor control signals are synchronized, if the first and second SINE stepper motor control signals are not synchronized wait until a first high SINE stepper motor control signal is detected, and count the number of first and second high SINE stepper motor control signals and the number of first and second high COSINE stepper motor control signals until one of each of the first and second SINE stepper motor control signals and first and second COSINE stepper motor control signals are low, and a number of counts of first or second high SINE stepper motor control signals or first or second high COSINE stepper motor control signals is greater than a predetermined number;

determine if a rollover condition has occurred, and if the rollover condition has occurred update a rollover counter.

18. The method according to claim 17, further including updating first and second SINE_sum_counters and first and second COSINE_sum_counters by a respective first and second high SINE count and a first and second high COSINE count.

19. The method according to claim 17, further including one of producing an error signal if any one of the first and second SINE stepper motor control signals or the first and second COSINE stepper motor control signals are not synchronized.

20. The method according to claim 17, further including producing an error signal if the rollover counter is not within a predetermined range.

* * * * *